US006985192B1

(12) United States Patent
Bouillet et al.

(10) Patent No.: US 6,985,192 B1
(45) Date of Patent: Jan. 10, 2006

(54) SELECTIVE GAIN ADJUSTMENT TO AID CARRIER ACQUISITION IN A HIGH DEFINITION TELEVISION RECEIVER

(75) Inventors: Aaron Reel Bouillet, Noblesville, IN (US); John Sidney Stewart, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 665 days.

(21) Appl. No.: 10/031,020

(22) PCT Filed: Jul. 13, 2000

(86) PCT No.: PCT/US00/19134

§ 371 (c)(1),
(2), (4) Date: Jan. 14, 2002

(87) PCT Pub. No.: WO01/06774

PCT Pub. Date: Jan. 25, 2001

Related U.S. Application Data

(60) Provisional application No. 60/144,413, filed on Jul. 16, 1999.

(51) Int. Cl.
*H04N 5/50* (2006.01)
(52) U.S. Cl. .................. 348/735; 348/725; 348/731; 348/678
(58) Field of Classification Search ............... 348/678, 348/725, 726, 731, 735; 375/326, 345
See application file for complete search history.

(56) References Cited

U.S. PATENT DOCUMENTS 5,546,138 A    8/1996  Krishnamurthy et al. ... 348/735

| 6,049,361 A * | 4/2000 | Kim ........................... 348/678 |
| 6,333,765 B1 * | 12/2001 | Okada et al. ................ 348/678 |
| 6,369,857 B1 * | 4/2002 | Balaban et al. ............. 348/555 |
| 6,735,423 B1 * | 5/2004 | Uskali et al. ............. 455/249.1 |

FOREIGN PATENT DOCUMENTS

WO          95/27371          10/1995

OTHER PUBLICATIONS

W. Bretl et al "VSB Modem Subsystem Design for Grand Alliance Digital Television Receivers", Aug. 1995 IEEE Transactions on Consumer Electronics, vol. 41, No. 3, pp. 773-786.

* cited by examiner

*Primary Examiner*—John Miller
*Assistant Examiner*—Trang U. Tran
(74) *Attorney, Agent, or Firm*—Joseph S. Tripoli; Robert D. Shedd; Brian J. Cromarty

(57) ABSTRACT

In a receiver for processing a vestigial sideband modulated signal containing terrestrial broadcast high definition television information and a pilot component, and for which multipath interference can lead to significant attenuation within narrow bands of the received signal spectrum containing the pilot tone of an Advanced Television Systems Committee high definition television broadcast signal, it has been found desirable to amplify the input signal in order to achieve synchronization of the receiver's phase-locked loop to the received pilot tone. Once this initial acquisition has been established, the amplification applied to the received signal can be reduced to a level appropriate for remaining blocks in the demodulation chain without upsetting the pilot tone synchronization. Thus, according to the present invention, the gain applied to the received ATSC VSB signal is set higher during pilot tone acquisition than it is during the remaining stages of demodulation.

17 Claims, 4 Drawing Sheets

US 6,985,192 B1

SELECTIVE GAIN ADJUSTMENT TO AID CARRIER ACQUISITION IN A HIGH DEFINITION TELEVISION RECEIVER

This application claims the benefit under 35 U.S.C. § 365 of International Application PCT/US00/19134, filed Jul. 13, 2000, which was published in accordance with PCT Article 21(2) on Jan. 25, 2001 in English; and which claims benefit of U.S. provisional application Ser. No. 60/144,413 filed Jul. 16, 1999.

FIELD OF THE INVENTION

This invention concerns a receiver system for processing a high definition television signal, e.g., of the Vestigial Sideband (VSB-modulated type proposed by the Grand Alliance in the United States.

BACKGROUND OF THE INVENTION

The recovery of data from modulated signals conveying digital information in symbol form usually requires three functions at a receiver: timing recovery for symbol synchronization, carrier recovery (frequency demodulation to baseband), and channel equalization, Timing recovery is a process by which a receiver clock (timebase) is synchronized to a transmitter clock. This permits a received signal to be sampled at optimum points in time to reduce slicing errors associated with decision-directed processing of received symbol values. Carrier recovery is a process by which a received radio frequency (RF) signal, after being frequency down converted to a lower intermediate frequency passband (eg., near baseband), is frequency shifted to baseband to permit recovery of the modulating baseband information. Adaptive channel equalization is a process by which the effects of changing conditions and disturbances in the signal transmission channel are compensated for. This process typically employs filters that remove amplitude and phase distortions resulting from frequency dependent time variant characteristics of the transmission channel, to provide improved symbol decision capability.

SUMMARY OF THE INVENTION

Multipath interference can lead to significant attenuation within narrow bands of the received signal spectrum. If this happens in the band of frequencies containing the pilot tone of an Advanced Television Systems Committee (ATSC) high definition television (HDTV) broadcast signal, it has been found desirable to amplify the input signal in order to achieve synchronization of the receiver's phase-locked loop to the received pilot tone. Once this initial acquisition has been established, the amplification applied to the received signal can be reduced to a level appropriate for remaining blocks in the demodulation chain without upsetting the pilot tone synchronization. Thus, according to the present invention, the gain applied to the received ATSC Vestigial Sideband (VSB) signal is set higher during pilot tone acquisition than it is during the remaining stages of demodulation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
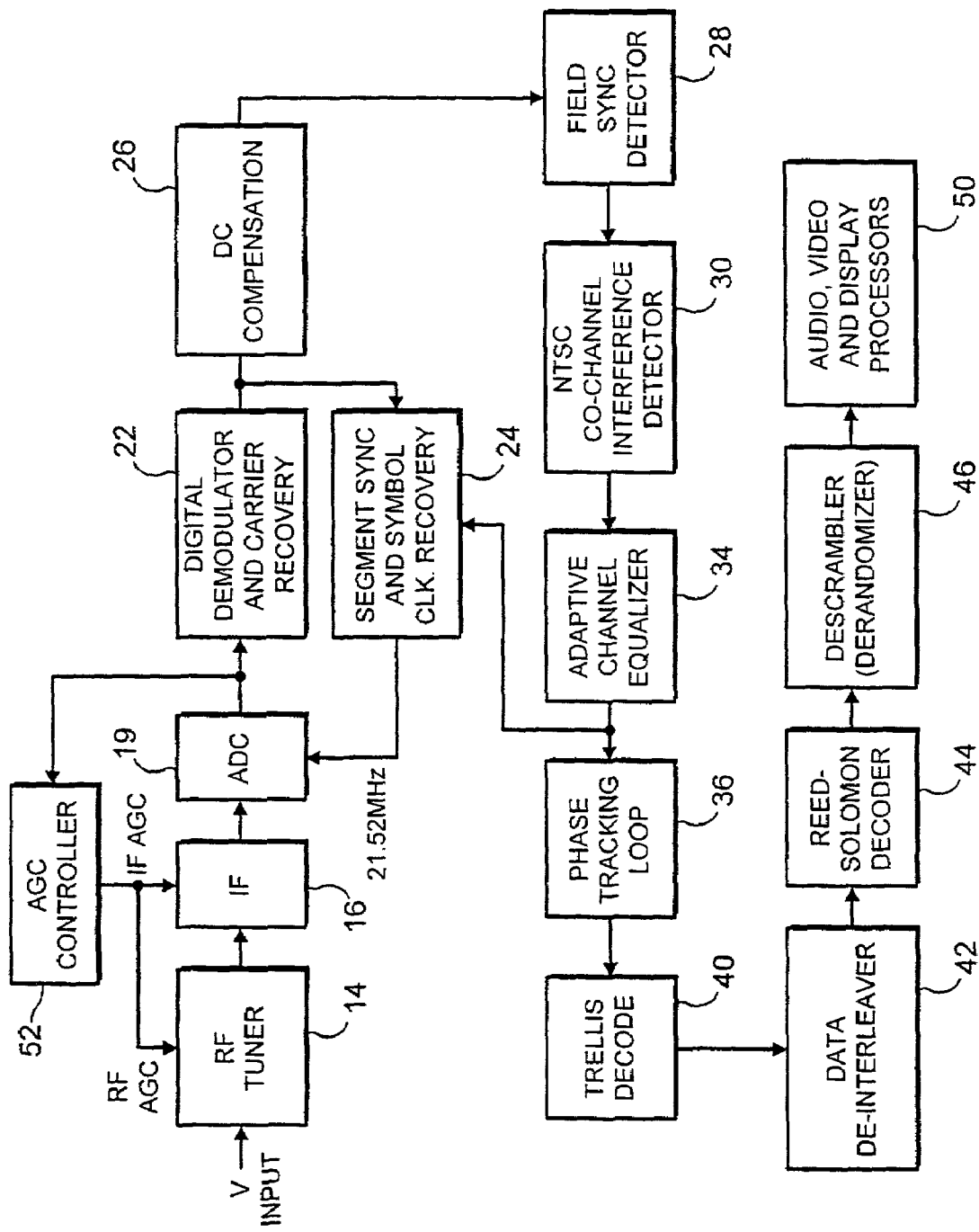
FIG. 1 is a block diagram of a portion of a high definition television (HDTV)

In FIG. 1, a terrestrial broadcast, analog input, high definition television (HDTV) signal is processed by an input network 14 including radio frequency (RF) tuning circuits and an intermediate frequency (IF) module 16 including a double conversion tuner for producing an IF passband output signal, and appropriate automatic gain control (AGC) circuits. The received signal is a carrier suppressed 8-VSB modulated signal as proposed by the Grand Alliance and adopted for use in the United States. Such a VSB signal is represented by a one-dimensional data symbol constellation wherein only one axis contains quantized data to be recovered by the receiver. To simplify FIG. 1, signals for clocking the illustrated functional blocks are not shown.

As described in the Grand Alliance HDTV System Specification dated Apr. 14, 1994, the VSB transmission system conveys data with a prescribed data frame format. A small pilot signal at the suppressed carrier frequency is added to the transmitted signal to help achieve carrier lock at a VSB receiver. Each data frame comprises two fields with each field including 313 segments of 832 multilevel symbols. The first segment of each field is referred to as a field sync segment, and the remaining 312 segments are referred to as data segments. The data segments typically contain MPEG compatible (MPEG: Moving Pictures Expert Group) data packets. Each data segment comprises a four symbol segment sync character followed by 828 data symbols. Each field segment includes a four symbol segment sync character followed by a field sync component comprising a predetermined 511 symbol pseudorandom number (PN) sequence and three predetermined 63 symbol PN sequences, the middle one of which is inverted in successive fields. A VSB mode control signal (defining the VSB symbol constellation size) follows the last 63 PN sequence, which is followed by 96 reserved symbols and 12 symbols copied from the previous field.

Continuing with FIG. 1, the passband IF output signal from IF module 16 is converted to an oversampled digital symbol datastream by an analog to digital converter (ADC) 19. The output oversampled digital datastream from ADC 19 is demodulated to baseband by an all digital demodulator/carrier recovery network 22. This is done by an all digital phase locked loop in response to the small reference pilot carrier in the received VSB datastream. Unit 22 produces an output I-phase demodulated symbol datastream as described in greater detail with regard to FIG. 3. In addition, unit 22 is coupled to an AGC controller 52 to produce IF and RF AGC signals in accordance with the present invention. The apparatus and method for generating the AGC signals is described below with respect to FIGS. 9 and 10.

ADC 19 oversamples the input 10.76 Msymbols/sec VSB symbol datastream with a 21.52 MHz sampling clock, i.e., twice the received symbol rate, thereby providing an oversampled 21.52 Msamples/sec datastream with two samples per symbol. The use of such two sample per symbol sample based processing, rather than symbol-by-symbol (one sample per symbol) symbol based processing, produces advantageous operation of subsequent signal processing functions such as are associated with DC compensation unit 26 and National Television Standard Committee (NTSC) interference detector 30 for example.

Associated with ADC 19 and demodulator 22 is a segment sync and symbol clock recovery network 24. Network 24 detects and separates the repetitive data segment sync components of each data frame from the random data. The segment syncs are used to regenerate a properly phased 21.52 MHz clock which is used to control the datastream symbol sampling by analog to digital converter 19. Network 24 advantageously uses an abbreviated two-symbol correlation reference pattern and associated two symbol data correlator to detect the segment sync.

A DC compensation unit 26 uses an adaptive tracking circuit to remove from the demodulated VSB signal a DC offset component due to the pilot signal component. A field sync detector 28 detects the data field sync component by comparing every received data segment with an ideal field reference signal stored in memory in the receiver. In addition to field synchronization, the field sync signal provides a training signal for channel equalizer 34.

NTSC interference detection and rejection are performed by unit 30. Afterwards, the signal is adaptively equalized by channel equalizer 34 which may operate in a combination of blind, training, and decision-directed modes. Equalizer 34 may be of the type described in the Grand Alliance HDTV System Specification and in an article by W. Bretl et al., "VSB Modem Subsystem Design for Grand Alliance Digital Television Receivers," IEEE Transactions on Consumer Electronics, August 1995. Equalizer 34 also may be of the type described in U.S. patent application Ser. No. 09/102, 885 (RCA 88,947). The output datastream from detector 30 is downconverted to a one sample/symbol (10.76 Msymbols/sec) datastream prior to equalizer 34. This downconversion may be accomplished by a suitable downsampling network (not shown to simplify FIG. 1).

Equalizer 34 corrects channel distortions, but phase noise randomly rotates the symbol constellation. Phase tracking network 36 removes the residual phase and gain noise in the output signal from equalizer 34, including phase noise which has not been removed by the preceding carrier recovery network in response to the pilot signal. The phase corrected signal is then trellis decoded by a trellis decoder 40, de-interleaved by a de-interleaver 42, Reed-Solomon error corrected by a Reed-Solomon decoder 44, and descrambled (de-randomized) by a descrambler 46. Afterwards, a decoded datastream is subjected to audio, video and display processing by unit 50.

Tuner 14, IF module 16, field sync detector 28, equalizer 34, phase tracking loop 36, trellis decoder 40, de-interleaver 42, Reed-Solomon decoder 44 and descrambler 46 may employ circuits of the type described in the Grand Alliance HDTV System Specification of Apr. 4, 1994, and in the Bretl, et al. article mentioned above. Circuits suitable for performing the functions of units 19 and 50 are well-known.

Demodulation in unit 22 is performed by an all digital automatic phase control (APC) loop to achieve carrier recovery. The phase locked loop uses the pilot component as a reference for initial acquisition and a normal phase detector for phase acquisition. The pilot signal is embedded in the received datastream, which contains data exhibiting a random, noise-like pattern. The random data is essentially disregarded by the filtering action of the demodulator APC loop. The 10.76 Msymbols/sec input signal to ADC 19 is a near baseband signal with the center of the VSB frequency spectrum at 5.38 MHz and the pilot component situated at 2.69 MHz. The input datastream is advantageously two-times oversampled by ADC 19 at 21.52 MHz. In the demodulated datastream from unit 22 the pilot component has been frequency shifted down to DC.

Figure 3:
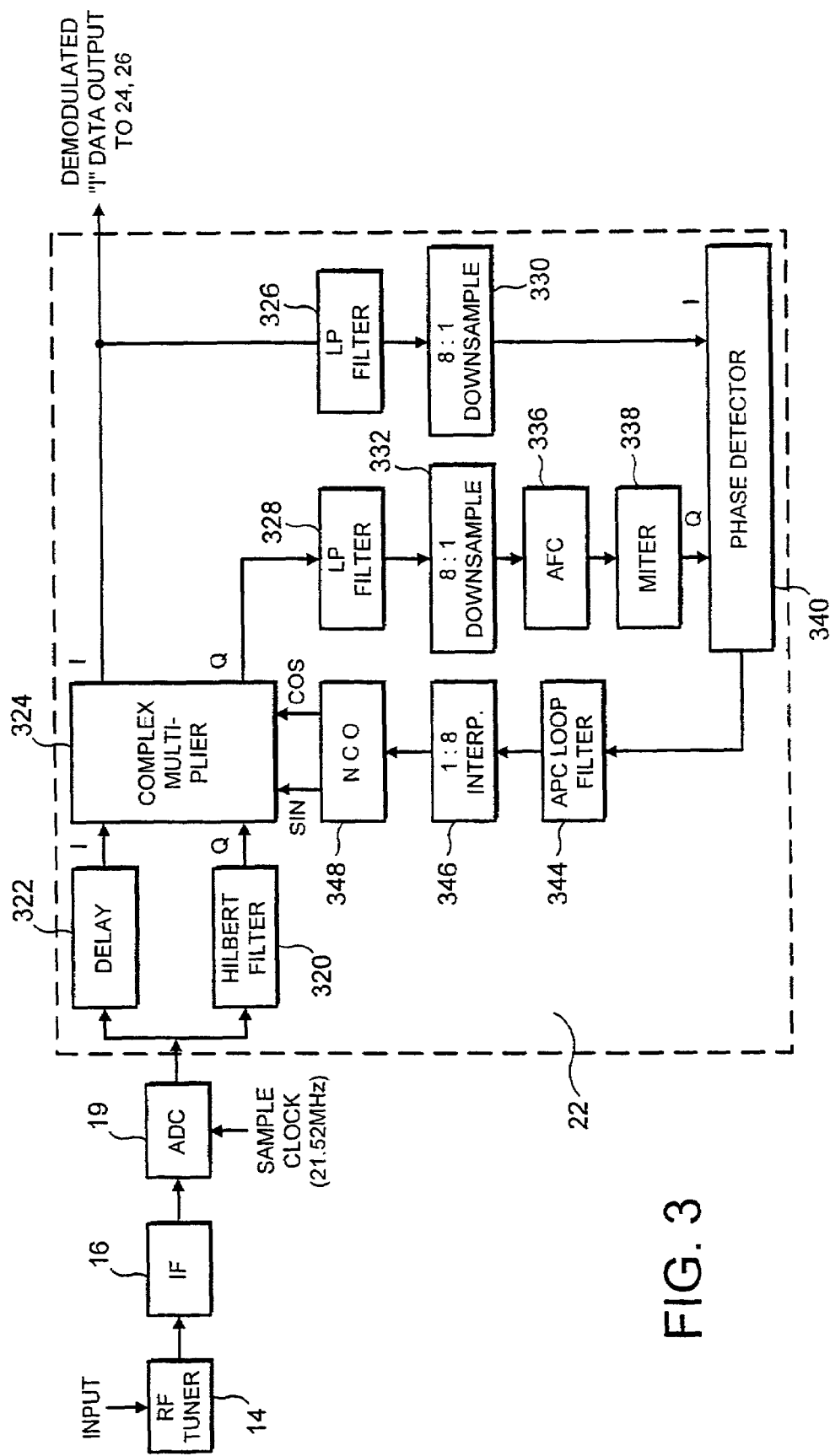
FIG. 3 shows details of a digital demodulator/carrier recovery network in FIG. 1.

FIG. 3 show details of digital demodulator 22. The 8-VSB modulated, oversampled digital symbol datastream from ADC 19, containing the very low frequency pilot component, is applied to inputs of a Hilbert filter 320 and a delay unit 322. Hilbert filter 320 separates the incoming IF sampled datastream into "I" (in phase) and "Q" (quadrature phase) components. Delay 322 exhibits a delay that matches the delay of Hilbert filter 320. The I and Q components are rotated to baseband using complex multiplier 324 in an APC loop. Once the loop is synchronized, the output of multiplier 324 is a complex baseband signal. The output I datastream from multiplier 324 is used as the actual demodulator output, and is also used to extract the pilot component of the received datastream using low pass filter 326. The output Q datastream from multiplier 324 is used to extract the phase of the received signal.

In the phase control loop, the I and Q output signals from multiplier 324 are respectively applied to low pass filters 326 and 328. Filters 326 and 328 are Nyquist low pass filters with a cut-off frequency of approximately 1 MHz, and are provided to reduce the signal bandwidth prior to 8:1 data downsampling by units 330 and 332. The downsampled Q signal is filtered by an automatic frequency control (AFC) filter 336. After filtering, the Q signal is amplitude limited by unit 338 to reduce the dynamic range requirements of phase detector 340. Phase detector 340 detects and corrects the phase difference between the 1 and 0 signals applied to its inputs, and develops an output phase error signal which is filtered by an APC filter 344, e.g., a second order low pass filter. The phase error detected by unit 340 represents a frequency difference between the expected pilot signal frequency near DC, and the received pilot signal frequency.

If the received pilot signal exhibits an expected frequency near DC, AFC unit 336 will produce no phase shift. The 1 and 0 channel pilot components input to phase detector 340 will exhibit no deviation from a mutually quadrature phase relationship, whereby phase detector 340 produces a zero or near zero value phase error output signal. However, if the received pilot signal exhibits an incorrect frequency, AFC unit 336 will produce a phase shift. This will result in an additional phase difference between the 1 and 0 channel pilot signals applied to the inputs of phase detector 340. Phase detector 340 produces an output error value in response to this phase difference.

The filtered phase error signal from filter 344 is upsampled 1:8 by interpolator 346 to account for the prior downsampling by units 330 and 332, so that numerical controlled oscillator (NCO) 348 operates at 21.52 MHz. The output of interpolator 346 is applied to a control input of NCO 348, which locally regenerates the pilot signal for demodulating the received datastream. NCO 348 includes sine and cosine look-up tables for regenerating the pilot tone at a correct phase in response to the phase control signal from units 340, 344 and 346. The outputs of NCO 348 are controlled until the I and Q signal outputs of multiplier 324 cause the phase error signal produced by phase detector 340 to be substantially zero, thereby indicating that a properly demodulated baseband I signal is present at the output of multiplier 324.

In digital demodulator 22, the main signal processing engine essentially comprises elements 336, 338, 340 and 344. The 8:1 downsampling provided by units 330 and 332 advantageously saves demodulator processing power and hardware and permits processing efficiencies by allowing APC loop elements 336, 338, 340 and 344 to be clocked at a lower clock rate, i.e., using a 21.52 MHz/8 or 2.69 MHz clock instead of a 21.52 MHz clock. When a digital signal processor (DSP) is used to implement network 22 and the phase detector loop in particular, the described data reduction results in software efficiencies by requiring proportionally fewer lines of instruction code, for example. DSP machine cycles are made available for other signal processing purposes. When an application specific integrated circuit (ASIC) is used to implement network 22, the data reduction results in reduced hardware and power requirements, as well as reduced integrated circuit surface area. The demodulator advantageously uses the pilot component to achieve carrier recovery, and employs feed-forward processing rather than more complicated and time consuming feedback processing using slicer decision data.

When multipath is present in an ATSC signal, it is possible for the pilot tone to be attenuated more than other frequencies in the spectrum. A phase-locked loop (PLL) is used to lock onto this pilot in order to have a coherent reference at the receiver for heterodyning the VSB spectrum down to baseband. Typically, this PLL will be able to track a lower-level signal than it will acquire. When the pilot tone attenuation due to multipath becomes severe enough, the automatic gain control circuits acting on the entire VSB spectrum may reach a steady-state condition such that there is not enough energy at the pilot tone frequency to be acquired. According to the present invention, the solution to this problem is to use a higher reference power for the automatic gain control (AGC) circuit during carrier acquisition than the one used during the rest of the demodulation process. This increases the pilot tone energy available at the PLL input during the acquisition stage. Hence, this method allows the pilot tone to be successfully acquired under higher levels of attenuation. After the PLL is locked, the AGC reference power (amplification factor) applied to the received signal can be lowered in accordance with the operating range of the remaining demodulation blocks.

Figure 2:
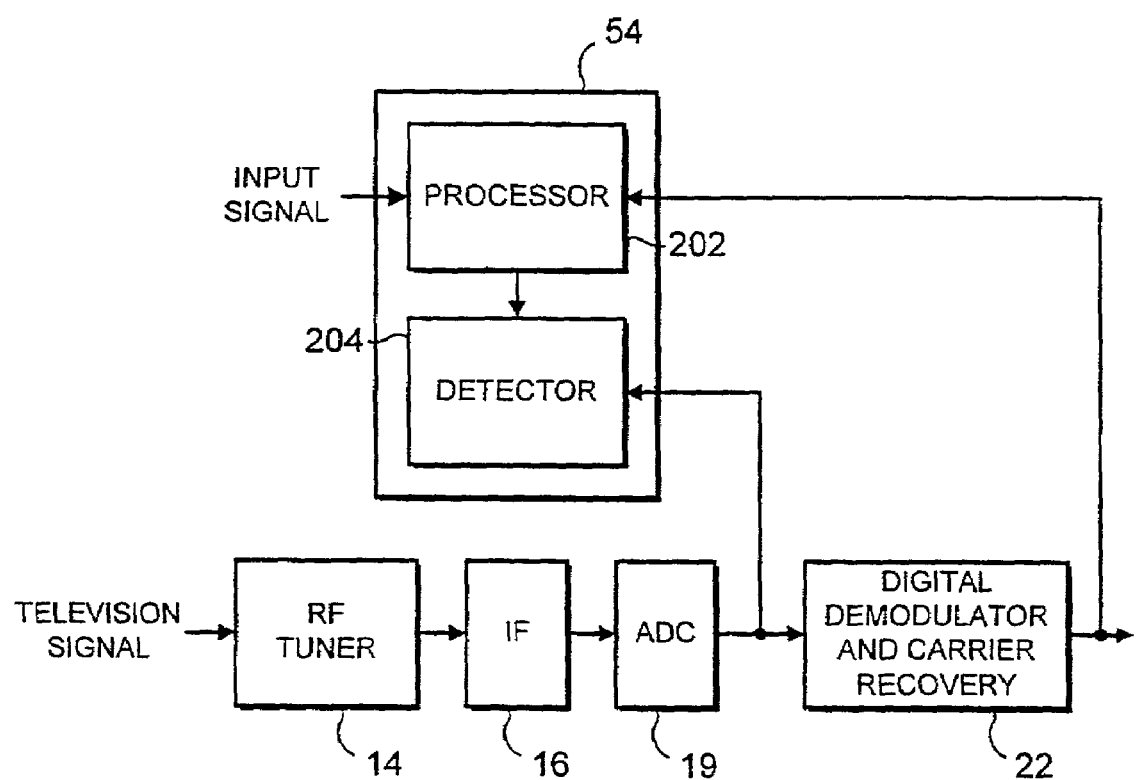
FIG. 2 shows details of the HDTV for performing carrier acquisition in accordance with the present invention.
Figure 4:
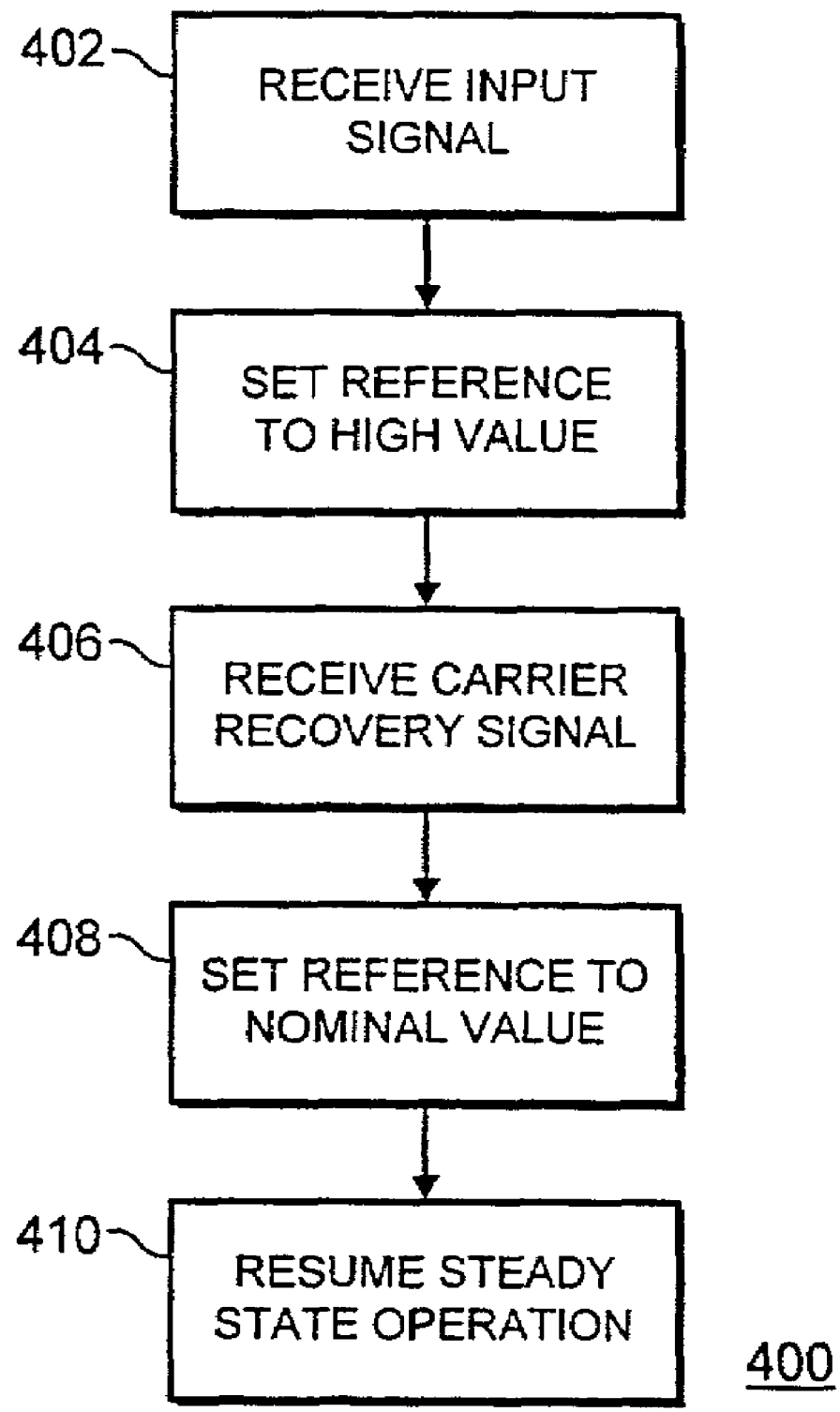
FIG. 4 shows a flowchart for implementing the present invention.

FIG. 2 shows details of the HDTV for performing carrier acquisition in accordance with the present invention. FIG. 4 shows a flowchart for implementing the present invention. To best understand the present invention, the reader should simultaneously refer to FIGS. 2 and 4.

More specifically, FIG. 2 depicts the AGC controller 52 comprising a processor 202 and a detector 204. The AGC controller 52 is coupled with the RF tuner 14, the IF tuner 16, the ADC 19 and the carrier recovery network 22 previously discussed with respect to FIG. 1. The processor 202 receives an input signal from an input device and sets a reference power value in the detector 204. The detector 204 compares the reference power value with the baseband or near-baseband television signal from the ADC 19, and generates a control signal received by the IF module 16.

In response to this control signal, the AGC circuits in the IF module 16 adjust the gain of the IF module 16. The control signal is configured to increase the gain when the power of the baseband television signal is below the reference power value. The control signal is also configured to decrease the gain when the power of the baseband television signal is above the reference power value. As such, the input television signal is amplified if the reference power value is increased. Similarly, the input television signal is attenuated if the reference power value is decreased. Although the gain of the IF module 16 was discussed above, the gain of the RF tuner 14 may also be adjusted in response to the control signal.

FIG. 4 shows the flowchart detailing a method 400 to implement the present invention. The method 400 starts at step 402, where the input signal is received at the processor 202. The input signal may be provided manually via a button or some input device (not shown), or automatically upon execution of a software program that performs pilot tone detection for a period of time. The method 400 proceeds to step 404, where the processor 202 sets the reference power value to a high reference power value, e.g., higher than the power of the baseband television signal. In response to the high reference power value, the detector 204 increases the value of a control signal to the IF module 16. Upon receipt of the increased value of the control signal, the gain of the IF module 16 is increased, thereby amplifying the television signal to a first amplification level. More importantly, the higher gain also increases the pilot tone energy at the carrier recovery network 26, thereby achieving carrier acquisition or acquisition to the pilot tone.

At step 406, the processor 202 receives a carrier lock signal from the carrier recovery network 26. The method 400 proceeds to step 408, where the processor 202 sets the reference power value to a lower or nominal reference power value, e.g., lower than the television signal having previously increased power. The nominal reference power value is appropriately set or empirically determined, in order to provide a baseband television signal suitable for performing other demodulation, acquisition or other HDTV functions discussed with respect to FIG. 1.

In response to the nominal reference power value, the detector 204 decreases the control signal to the IF module 16. Upon receiving the decreased control signal, the IF module 16 amplifies the television signal to a second amplification level. As the second amplification level is lower than the first amplification level, the gain of the IF module 16 is decreased. After setting the lower reference power value at step 408, the method 400 proceeds with remaining acquisition and HDTV steady-state operation at step 410.

Once the pilot tone is detected, the data signal is demodulated and processed in a conventional manner as described in U.S. patent application Ser. No. 09/140,257, filed Aug. 26, 1998 (RCA 89,095).

Although various embodiments which incorporate the teachings of the present invention have been shown and described in detail herein, those skilled in the art can readily devise many other varied embodiments that will still incorporate these teachings.

What is claimed is:

1. Method of performing carrier acquisition of a television signal having a pilot tone centered around a carrier frequency, the method comprising:

amplifying said television signal using a first amplification level in response to a control signal; and acquiring the carrier frequency from said amplified television signal; and amplifying said television signal, in response to acquiring the carrier frequency, using a second amplification level, where said first amplification level is greater than said second amplification level.

2. The method of claim 1, characterized in that said amplifying comprises:

setting a reference power value to a high value; and increasing a value of said control signal if said reference power value is greater than a power value of said television signal, where the amplifying using said first amplification level occurs in response to the increased value of said control signal.

3. The method of claim 2, characterized in that said setting occurs in response to an input command.

4. The method of claim 1, characterized in that said acquiring comprises: detecting said pilot tone from said television signal.

5. The method of claim 1, characterized in that said amplifying after said acquiring comprises:
   setting a reference power value to a low value, said setting is provided in response after acquiring the carrier frequency;
   decreasing a value of said control signal if said reference power value is less than a power value of said television signal, where the amplifying using said second amplification level occurs in response to the decreased value of said control signal.

6. The method of claim 1, characterized in that said amplifying comprises increasing a gain of an intermediate frequency (IF) module.

7. The method of claim 1, characterized in that said amplifying after said acquiring comprises decreasing a gain of an intermediate frequency (IF) module.

8. The method of claim 1, characterized in that it further comprises generating a carrier lock signal upon acquiring the carrier frequency, where said amplifying using said second amplification level occurs in response to said carrier lock signal.

9. The method of claim 1, characterized in that said television signal comprises a received vestigial sideband (VSB) modulated signal containing high definition video data.

10. An apparatus for performing carrier acquisition of a television signal having a pilot tone centered about a carrier frequency, the apparatus comprising:
    a tuner circuit for amplifying said television signal using a first amplification level and amplifying said television signal using a second amplification level, where said first amplification level is greater than said second amplification level;
    a carrier recovery circuit for acquiring the carrier frequency from said amplifier television signal; and
    a control circuit, coupled to said tuner and said carrier recovery circuit, for generating a control signal and generating said control signal in response to said carrier recovery circuit recovers the carrier frequency.

11. The apparatus of claim 10, characterized in that said control circuit comprises an automatic gain control (AGC) controller.

12. The apparatus of claim 10, characterized in that said AGC controller comprises:
    a processor for setting a reference power value to a high value; and
    a detector, coupled to said processor, for increasing a value of said control signal if said reference power value is greater than a power value of said television signal, where said tuner circuit amplifies said television signal using said first amplification level in response to the increased value of said control signal.

13. The apparatus of claim 12, wherein said processor sets said reference power value to a low value after recovery of the carrier frequency, and said detector decreases the value of said control signal if said reference power value is less than said power value of said television signal, where said tuner circuit amplifies said television signal using said second amplification level in response to the decreased value of said control signal.

14. The apparatus of claim 10, characterized in that said tuner circuit comprises an intermediate frequency (IF) module.

15. The apparatus of claim 10, characterized in that a gain of said tuner circuit is increased upon receipt of the increased value of said control signal.

16. The apparatus of claim 10, characterized in that a gain of said tuner circuit is decreased upon receipt of the decreased value of said control signal.

17. The apparatus of claim 10, characterized in that said television signal comprises a received vestigial sideband (VSB) modulated signal containing high definition video data.

* * * * *